United States Patent Office 2,847,283
Patented Aug. 12, 1958

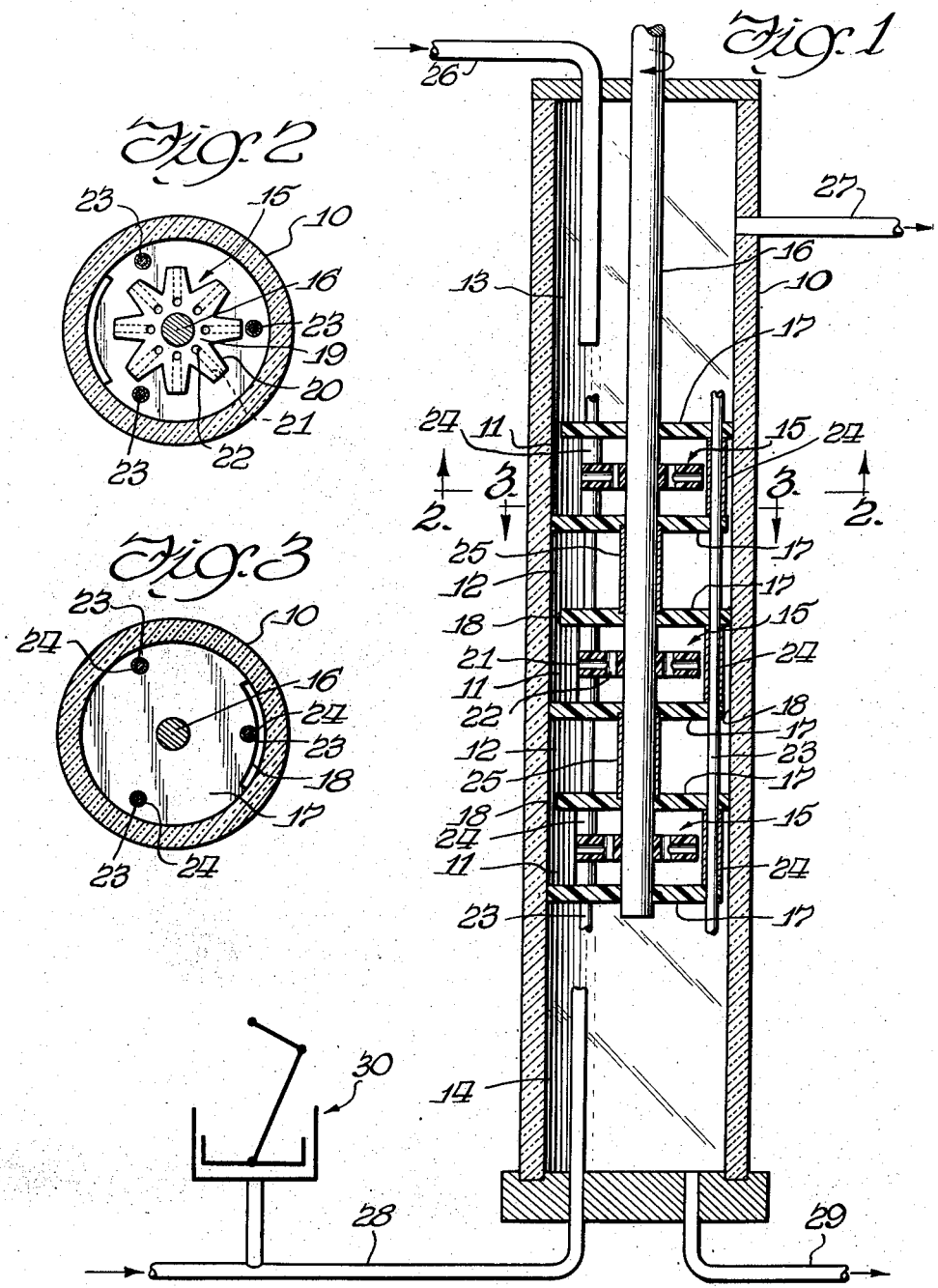

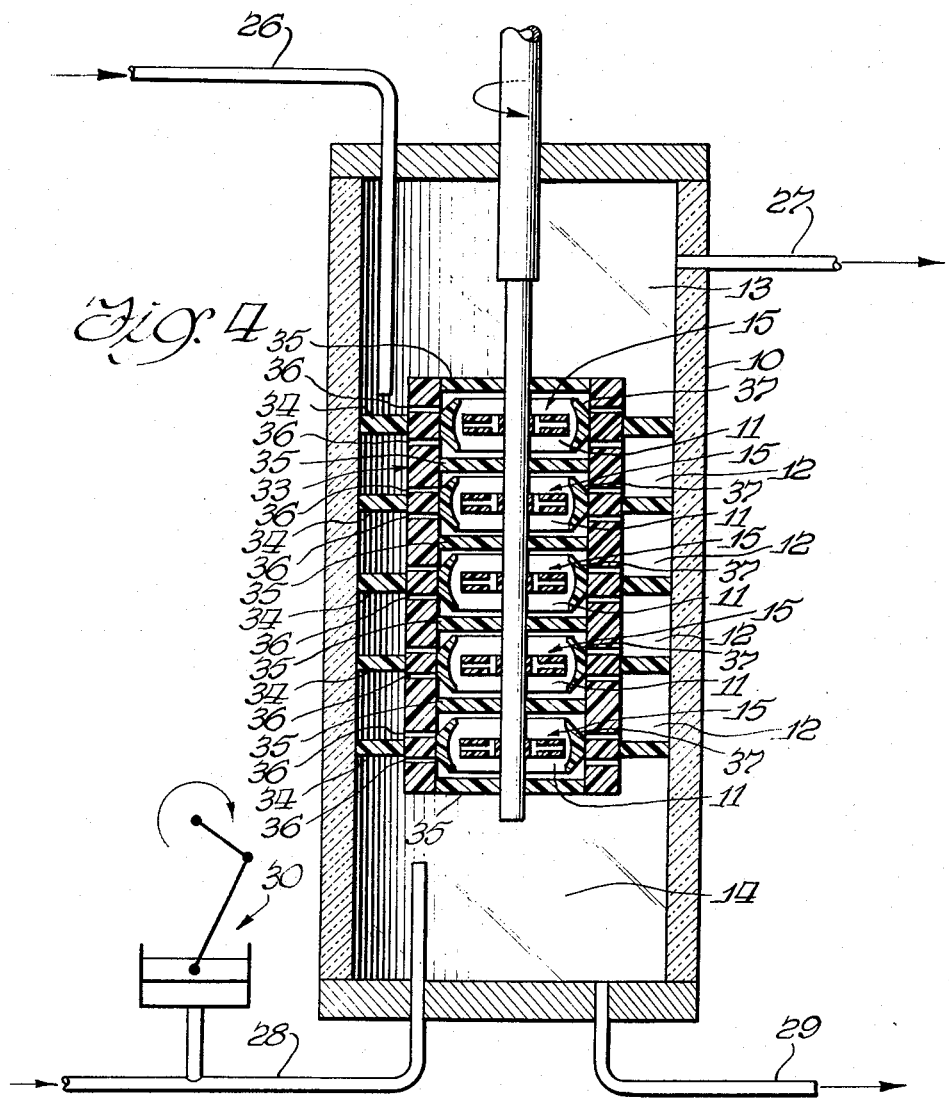

2,847,283

PULSED MIXER-SETTLER SOLVENT EXTRACTION CONTACTORS

Warren S. Figg, Richland, Wash., assignor to the United States of America as represented by the United States Atomic Energy Commission Application November 25, 1955, Serial No. 549,207

8 Claims. (Cl. 23—270.5)

This invention relates to a new and improved apparatus for contacting immiscible liquids having different specific gravities. It has especial application to the art in which two non-miscible or only partly miscible fluids of different specific gravities, preferably liquids, can be continuously and countercurrently contacted, one with the other. Such apparatus is frequently employed for the purpose of withdrawing one or more components from one liquid with the aid of another liquid, as in extracting, washing, or chemical treating operations, and apparatus according to the present invention is well suited for operations of this character.

Various proposals have been made in the past of apparatus for contacting immiscible liquids. It has been proposed, for example, that the immiscible liquids be countercurrently contacted in an apparatus in which the liquids pass alternately through mixer sections where they are violently agitated and settler sections where they are permitted to separate into layers. An apparatus of this type is shown in U. S. Patent Number 2,682,453, issued to C. H. Holder et al. This type of device is called a mixer-settler contact apparatus.

Another proposal is that the immiscible liquids be counter-currently contacted by dispersing the heavier liquid downwardly through relatively small openings in a perforated plate and into an extended body of a continuous phase of a second and lighter liquid and/or effecting the reverse operation. An apparatus of this type wherein the dispersion is effected by means of pulses applied to one of the liquids entering the contact apparatus is shown in U. S. Patent Number 2,011,186, issued to W. J. D. Van Dijck. This device is called a pulse column contact apparatus.

The use of solvent extraction to separate plutonium, uranium and fission products from reactor irradiated fuels and valuable waste products from neutronic reactors is currently of importance. In the process that has been developed the uranium slug that has been used as fuel in a reactor is dissolved with nitric acid using a catalyst.

The aqueous feed, containing uranium, plutonium and fission products, is pumped to a first extraction column where plutonium and uranium are extracted into an organic solvent—tributyl phosphate dissolved in a carrier. Most of the fission products are removed from the uranium and plutonium in this extraction step. The organic phase flows to another extraction column where plutonium is reduced and back extracted into a water stream. Finally in another column water is employed to strip the uranium into aqueous solution. Various purification stages are necessary subsequent to the primary separation.

As the fission products are very highly radioactive and the plutonium sufficiently so that shielding is necessary, it is necessary to shield the entire system to protect the workers against radioactivity. This is accomplished by building concrete walls, up to two feet thick, around the equipment. It is apparent that any reduction in size of the equipment would be desirable so that the amount of shielding could be reduced.

It is accordingly an object of this invention to provide an improved multistage contact apparatus suitable for use as an extraction apparatus which has a very high efficiency per unit length.

It is also an object of this invention to provide an improved multistage extraction apparatus which is particularly useful when radioactive materials are to be handled.

These and other objects are attained by an extraction column embodying the principles of both the mixer-settler type extraction column and the pulse type column.

For a better understanding of the invention reference is made to the accompanying drawings wherein:

Fig. 1 is a vertical cross sectional view of a pulsed mixer-settler solvent extractor according to my invention wherein the pulse generator is shown diagrammatically;

Fig. 2 is a horizontal cross sectional view taken on line 2—2 of Fig. 1;

Fig. 3 is a horizontal cross sectional view taken on line 3—3 of Fig. 1; and

Fig. 4 represents a vertical cross sectional view of a different embodiment of my invention wherein the pulse generator is shown diagrammatically.

As shown in Fig. 1, a pulsed mixer-settler contact apparatus according to my invention may comprise a cylindrical column 10, which may be formed of stainless steel, a plurality of mixer sections 11 of which three are shown, a plurality of settler sections 12, separating the mixer sections, and upper and lower disengaging sections 13 and 14, respectively. The mixing and settling sections are of approximately the same length while the disengaging sections are three or four times the length of the mixing and settling sections.

Each of the mixer sections contains an impeller 15 which is held in place by a forced fit on drive shaft 16. The column is separated into alternate mixing and settling sections by spaced separator plates 17 with two plates being located between adjacent impellers and with all plates being located approximately the same distance apart. A single plate is provided above the top impeller and a single plate below the lowest impeller. The plates are constructed as shown in Fig. 3 with narrow peripheral recesses 18 formed along one side thereof. These recesses form with the column flow slots for the passage of liquids therethrough. The flow slots are on opposite sides of adjacent plates so that the path of flow through the column is from one side of the column to the other. This arrangement reduces back mixing and makes horizontal operation of the unit possible. The plates may be formed of any suitable material such as stainless steel or fluorothene.

A particularly desirable arrangement is to alternate plates of fluorothene and stainless steel within the column.

The impellers likewise may be formed of fluorothene or stainless steel or other suitable corrosion-resistant material. Each impeller (see Fig. 2) comprises a hub 19 having a plurality of arms 20 extending radially outward therefrom. Each arm has an opening 21 extending inwardly from the periphery thereof and joining at its inner end to an opening 22 extending through the hub transversely to the first mentioned opening.

Three stainless steel support rods 23 which extend the length of the column are provided with spacer sleeves 24 within the mixing sections and the drive shaft is encased in spacer sleeves 25 within the settling zones to support the plates in proper location in the column. Sufficient clearance, of course, is provided to permit rotation of the drive shaft.

The column is provided with an inlet 26 for heavy liquid at one end of the column, an outlet 27 for light liquid at the same end of the column, an inlet 28 for light liquid at the other end of the column, and an outlet 29 for heavy liquid at the said other end of the column. A pulse generator, shown diagrammatically at 30, is connected to the inlet 28. This pulse generator may be one of several well known types, as, for example, a reciprocating pump.

With the above described structure in mind the operation of an extraction process employing the apparatus will now be described. The column may be set up in a horizontal position, a vertical position, or in any position inbetween. In the horizontal position packing glands or their equivalent would be needed. For large columns this disadvantage might be outweighed by the advantages derived from the smaller amount of head room needed.

After setting up the column in the desired position a relatively heavy liquid will be introduced into column 10 through line 26 and a relatively light liquid will be introduced through line 28. With the impellers in operation the relatively light and relatively heavy liquids will meet and mix in the mixing zones. In order to obtain counter-current flow of the two liquids a slow pulsation is given to the light liquid feed stream by means of pulsator 30.

The two liquids are thoroughly mixed in the mixing zones effecting the extraction of the desired component from one liquid into the other liquid. Pulsation of the light liquid feed causes an upward flow through the peripheral recesses in the separator plates. The flow from the mixer zone into the separator zones constitutes a mixture of the light and heavy liquids. In the separator zones these phases separate so that at the bottom of the separator zones there is nearly purely heavy liquid and in the top nearly purely light liquid.

Thus during the pulse, lighter liquid flows from the separator zone into the next higher mixer zone while mixed liquid flows into the separator zone from the next lower mixer zone. During the interval between pulses the heavy liquid in the bottom of the separator zone will flow into the next lower mixer zone while the mixed liquids will flow from the mixer zone into the next lower separator zone.

Thus we have a countercurrent flow of the light and heavy liquids through alternate mixing and settling zones. Eventually the light liquid will reach the upper disengaging zone which is large enough so that the light and heavy liquids contained therein will separate into phases with the light liquid being removed through outlet line 27. The heavy liquid flows down the column till it reaches the lower disengaging zone from which it leaves the column through line 29.

The basic operation of the second embodiment of the invention illustrated in Fig. 4 is substantially the same as that of the embodiment of the invention previously described. However, its structure is such that it possesses even higher efficiency per unit length than did the first embodiment.

In this embodiment of the invention the cylindrical column, impellers, drive shaft, upper and lower disengaging zones, and inlet and outlet lines are exactly the same as they were in the embodiment already described. Therefore these elements are given the same numbers as their counterparts in Fig. 1 and will not be further described.

However, the mixing and settling zones, instead of being stacked one on the other as in Fig. 1, are arranged so that settling zones 12 form an annulus about mixing zones 11. Separating these zones is a tubular member 33 positioned about the drive shaft and coaxial therewith. The space between the tubular member and the column is divided into a plurality of settling zones 12 by a plurality of spaced separator rings 34 aligned with the impellers. The space within the tubular member is divided into a plurality of mixing zones 11 by a plurality of spaced separator disks 35 arranged in staggered relation to the separator rings as shown.

Flow holes 36 are provided in the tubular column to permit flow passage between the mixer and settler zones. In addition a baffle ring 37 surrounds each impeller.

The operation of the device is exactly the same as that of the device of Fig. 1. In the mixing zones the two liquids are contacted the one with the other and in the separating zones the two liquids are permitted to separate. Flow between mixing and settling zones is through the flow holes 36 and the slow pulsation of the light inlet feed causes countercurrent flow of the two liquids.

One of the primary advantages arising from the construction described herein results from the fact that the efficiency per unit length is high. Due to this fact a shorter column may be used to accomplish the same results that the longer columns previously used accomplished. This advantage becomes particularly important when radioactive materials are being processed.

Accordingly the effectiveness of the extraction columns was tested by using it in the process for the separation of plutonium, uranium and fission products previously described. For test purposes unirradiated uranium was chosen and the tests were carried out by testing the effectiveness of the column in the extraction of uranium nitrate from an aqueous solution thereof using as extractant a thirty percent solution of tributyl phosphate in kerosene. For the first two runs a simple extractor having six stages built along the lines of Fig. 1 of the drawing was employed. The column was of glass, the impellers were formed from fluorothene and the plates in run 1 were formed from fluorothene while in run 2 the bottom plate was fluorothene and the other plates were alternately formed of stainless steel and of fluorothene. In run 1 the impellers did not have the radial holes shown in the drawing. To show that the device could operate in positions other than the vertical the first 1.5 hours of run 1 were carried out with the column inclined 30 degrees from the vertical and the last 1.5 hours with the column 15 degrees from the horizontal.

*Table I*

COLUMN SPECIFICATIONS

Length of column, inches_____ 12
Internal diameter of column, inches_____ 1
Number of mechanical stages_____ 6
Agitator section length, inches_____ 0.5
Settling section length, inches_____ 0.5

RUN DATA

|  | Run Number | |
| --- | --- | --- |
|  | 1 | 2 |
| Feed conc., gm./l. uranium nitrate hexahydrate | 402 | 402 |
| Waste conc., gm./l. uranium nitrate hexahydrate | .035 | .035 |
| Volume velocity, gal./(hr.) (sq. ft.) | 45 | 100 |
| Pulse frequency, cycles/min | 20 | 20 |
| Pulse amplitude, inches | 0.5 | 0.5 |
| Agitator speed, R. P. M | 2,000 | 500 |
| Aqueous-organic volume ratio | .50 | .50 |
| Number of theoretical stages | 3.20 | 3.20 |
| Height equivalent to a theoretical stage, inches | 1.80 | 1.80 |
| Stage efficiency, percent | 53 | 53 |
| Duration, hours | 3 | 1.5 |

These runs confirmed the efficacy of this type of column as the height equivalent to a theoretical stage was calculated as 1.8 inches, giving a stage efficiency of 53% at a waste loss of only 0.008% uranium. This high stage efficiency results in a considerable departure from the operation of contactors such as the pulsed or packed columns. The changes made before the second run enabled the time to be reduced, the impeller speed to be reduced and the volume velocity to be increased. In run 2 the volume velocity was limited by the pump capacity rather than by the tendency of the column to flood.

In order to test this extractor still further, the extractor was employed for a stripping operation which is the third stage in the uranium, plutonium process to which reference was previously made.

Table II
COLUMN SPECIFICATIONS

|  | Run Number | |
|---|---|---|
|  | 3 | 4 |
| Length of column, inches | 12 | 12 |
| Internal Diameter of column, inches | 1 | 1 |
| Number of mechanical stages | 6 | 5 |
| Agitator section length, inches | 0.5 | 0.5 |
| Settling section length, inches | 0.5 | 1.0 |

RUN DATA

|  |  |  |
|---|---|---|
| Feed conc., gm./l. uranium nitrate hexahydrate | 195 | 195 |
| Waste conc., gm./l. uranium nitrate hexahydrate | (*) | 15 |
| Volume velocity, gal./(hr.) (sq. ft.) | 35 | 100 |
| Pulse frequency, cycles/min | 18 | 20 |
| Pulse amplitude, inches | 0.5 | 0.5 |
| Agitator speed, R. P. M | 500 | 500 |
| Aqueous-organic volume ratio | 1.56 | 1.56 |
| Number of theoretical stages | (*) | 3.3 |
| Height equivalent to a theoretical stage, inches | (*) | 2.0 |
| Stage efficiency, percent | (*) | 66 |
| Duration, hours | (*) | 1.5 |

*Not determined.

In the case of run 3 the flooding capacity was found to be only slightly in excess of 35 gal./(hr.) (sq. ft.). Since the pumping rates were hard to control at this rate the run was discontinued without taking any samples. By increase of the settling section length to one inch and reduction of the number of mechanical stages to five as in run 4, a two-inch height equivalent to a theoretical stage at a 7.5 percent waste loss was obtained. As in run 2 the volume velocity was limited by the pump capacity rather than by the tendency of the column to flood. Thus the column can also be employed as a replacement for the columns previously used to strip the uranium from the organic solvent.

A single column of the type shown in Fig. 1 having sections for the three operations of extraction, scrubbing and stripping was also constructed. Employment of a single column constructed in this manner rather than three separate columns was found to be mechanically feasible.

The next test was with the contact apparatus shown in Fig. 4. The process carried out was the simple extraction of uranium nitrate with tributyl phosphate in a kerosene carrier.

Table III
COLUMN SPECIFICATIONS

| | Run number 1 |
|---|---|
| Maximum diameter of annulus, inches | 2.0 |
| Minimum diameter of annulus, inches | 1.25 |
| Settling section height, inches | 0.437 |
| Internal diameter of agitator section, inches | 1.0 |
| Agitator section length, inches | 0.437 |
| Number of mechanical stages | 5 |
| Over-all column length, inches | 5 |

RUN DATA

| | |
|---|---|
| Feed conc., gm./l. uranium nitrate hexahydrate | 402 |
| Waste conc., gm./l. uranium nitrate hexahydrate | 0.008 |
| Volume velocity, gal./(hr.) (sq. ft.) | 25 |
| Pulse frequency, cycles/min | 15 |
| Pulse amplitude, inches | 0.125 |
| Agitator speed, R. P. M | 2000 |
| Aqueous-organic volume ratio | .56 |
| Number of theoretical stages | 3.8 |
| Height equivalent to a theoretical stage, inches | .80 |
| Stage efficiency, percent | 75 |
| Duration, hours | 3 |

Again the volume velocity was limited by the pump capacity rather than the tendency of the column to flood. This run is notable for the high stage efficiency and low height equivalent to a theoretical stage at only 0.002 percent uranium waste loss.

It is apparent from these tests that an efficient multistage extractor, of which two forms are shown, has been developed which is suitable for general use and is highly efficacious for use with radioactive materials.

While this invention has been described with reference to specific embodiments thereof, it will be understood that various modifications coming within the scope of the invention may be utilized, and it is intended that the appended claims shall cover all such modifications as fall within the true spirit and scope of the invention.

What is claimed is:

1. An apparatus for intimately contacting and separating substantially immiscible liquids of different specific gravities, comprising a hollow column, means for dividing the column into a plurality of mixing and settling zones, a rotary drive shaft extending coaxially through the column, a plurality of impellers fixed to the shaft and located in the mixing zones, said impellers comprising a hub having a plurality of arms extending radially outwardly therefrom, each arm having an opening extending inwardly from the periphery thereof, said hub having a plurality of openings extending therethrough transversely to the openings in the arms and communicating therewith, an inlet for heavy liquid at one end of the column, an outlet for light liquid at said one end of the column, an inlet for light liquid at the other end of the column, an outlet for heavy liquid at the said other end of the column, and a pulse generator connected to the inlet for light liquid.

2. An apparatus for intimately contacting and separating substantially immiscible liquids of different specific gravities, comprising a hollow column, a rotary drive shaft extending coaxially through the column, a plurality of impellers fixed to the drive shaft in spaced relation to one another, a plurality of sets of separator plates, each set comprising two plates located between adjacent impellers in spaced relation thereto and to one another so as to provide alternate mixer sections and alternate settler sections, one plate of each set having at one side a peripheral recess forming with the column a first flow slot, the other plate of each set having at the opposite side a peripheral recess forming with the column a second flow slot diametrically opposed to the first flow slot, an inlet for heavy liquid at one end of the column, an outlet for light liquid at said one end of the column, an inlet for light liquid at the other end of the column, an outlet for heavy liquid at the said other end of the column, and a pulse generator connected to the inlet for light liquid.

3. The apparatus specified in claim 2 wherein one plate of each section is formed of stainless steel and the other plate of each section is formed of fluorothene.

4. The apparatus specified in claim 2 wherein the impeller comprises a hub and a plurality of radial arms of substantial width and having a first set of openings extending lengthwise of the arms and a second set of openings extending through the hub transversely to the first set of openings and being connected with the inner ends thereof.

5. The apparatus specified in claim 2 and further comprising support rods extending longitudinally of the column, spacer sleeves on the rods within the mixer zones and spacer sleeves on the drive shaft within the settling zones.

6. An apparatus for intimately contacting and separating substantially immiscible liquids of different specific gravities, comprising a hollow column, a rotary drive shaft extending coaxially through the column, a plurality of impellers fixed to the drive shaft in spaced relation to one another, a tubular member positioned in the column about the drive shaft and coaxial therewith, a plurality of spaced separator rings positioned between the column and the tubular member and aligned with the impellers so as to divide the space therebetween into settler zones, a plurality of spaced separator disks positioned within the tubular member in staggered relation to the separator rings so as to divide the space within the tubular member into mixer zones, said tubular members having penetrating flow holes therein to permit flow passage between the mixer and settler zones, an inlet for heavy liquid at one end of the column, an outlet for light liquid at said one end of the column, an inlet for light liquid at the other end of the column, an outlet for heavy liquid at the said other end of the column, and a pulse generator connected to the inlet for light liquid.

7. The apparatus specified in claim 6 wherein the impeller comprises a hub and a plurality of radial arms having a first set of openings extending lengthwise of the arms and a second set of openings extending through the hub transversely to the first set of openings and being connected with the inner ends thereof.

8. The apparatus specified in claim 7 and further comprising a baffle ring surrounding each impeller.

References Cited in the file of this patent

UNITED STATES PATENTS

| | | |
|---|---|---|
| 742,712 | Morris | Oct. 27, 1903 |
| 1,474,062 | Bollmann | Nov. 13, 1923 |
| 1,765,386 | Wait | June 24, 1930 |
| 2,011,186 | Van Dijck | Aug. 13, 1935 |
| 2,266,521 | Van Dijck | Dec. 16, 1941 |
| 2,646,346 | Coplon et al. | July 21, 1953 |
| 2,662,001 | Burns et al. | Dec. 8, 1953 |

OTHER REFERENCES

Sege et al.: Chem. Eng. Progress, August 1954, page 396.